UNITED STATES PATENT OFFICE.

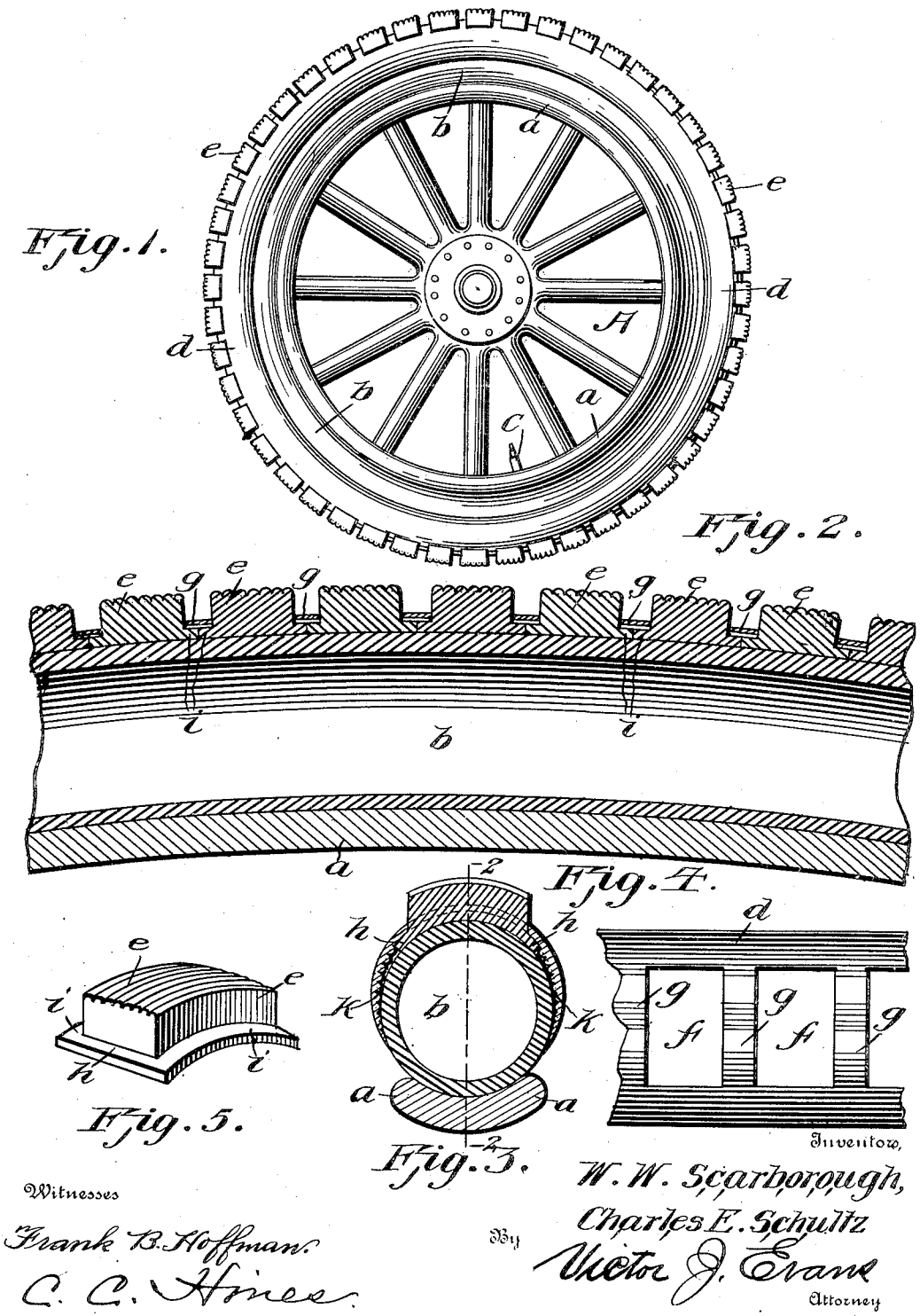

WILLIAM WILEY SCARBOROUGH AND CHARLES EDWARD SCHULTZ, OF KNOXVILLE, TENNESSEE.

PNEUMATIC-TIRE PROTECTOR.

No. 822,307.          Specification of Letters Patent.          Patented June 5, 1906.

Application filed February 4, 1905. Serial No. 244,251.

*To all whom it may concern:*

Be it known that we, WILLIAM WILEY SCARBOROUGH and CHARLES EDWARD SCHULTZ, citizens of the United States, residing at Knoxville, in the county of Knox and State of Tennessee, have invented new and useful Improvements in Pneumatic-Tire Protectors, of which the following is a specification.

This invention relates to protectors for pneumatic tires; and the object of the invention is to provide a device of this character that may be easily placed upon or removed from the air-tube of the tire when deflated and which will be held securely in position on the tube when the latter is inflated without the use of any special fastening devices.

A preferred form of the invention will be fully described hereinafter, reference being had to the accompanying drawings, in which—

Figure 1 is a side elevation of a wheel, showing the protector in position upon the pneumatic tire. Fig. 2 is a longitudinal section of a portion of the tire and protector on the line 2 2 of Fig. 3. Fig. 3 is a transverse section through the tire and protector. Fig. 4 is a plan view of a portion of the protector, which will be hereinafter designated the "shield;" and Fig. 5 is a perspective view of a shoe, a series of which are employed with the shield to form the protector.

A represents a wheel, which may be of any preferred form of construction as to the hub and spokes and upon the rim $a$ of which a pneumatic tube $b$ may be secured in any ordinary manner, said tube being provided with the usual inflating-valve $c$.

The protector consists of a shield $d$ and a series of shoes $e$. The shield will preferably be formed of comparatively thin metal, although it may be of wood, and will be semicircular in cross-section to fit over and inclose the tube $b$ preferably for more than half the circumference of the tube. The shield is provided with a series of slots or openings $f$ in its peripheral portion, which slots may be any desired distance apart and are separated by the bars $g$.

The shoes $e$, which may be of metal, wood, or any other suitable material, will form the traction-surface of the wheel and are of such size as to project through the openings $f$ in the shield. They are curved on their inner or lower surfaces to fit snugly on the air-tube $b$ and are provided with flanges $h$ on opposite sides which lie under the side portions of the shield, as clearly shown in Fig. 3, and with flanges $i$ on their other two opposite sides, which lie under the bars $g$ of the shield, as clearly shown in Fig. 2. The outer or tread surface of the shoes will also preferably be curved and may be corrugated or otherwise roughened to prevent slipping of the wheel on wet or icy surfaces.

The inner surface of the shield is also corrugated or otherwise roughened, as indicated by $k$ in Fig. 3, to prevent relative movement between the air-tube $b$ and the protector after the tube is inflated.

In applying the protector the shoes $e$ are inserted through the openings $f$ of the shield and preferably they will fit snugly therein. The shield and shoes are then fitted in proper position over the tube $b$, when the latter is deflated, and then the tube $b$ is inflated, and the protector will thereby be held securely in position upon the tube. It is obvious that the shoes can be separately replaced when worn or broken and that they and the shield thoroughly protect the tube against liability to puncture.

Without limiting ourselves to the precise details of construction illustrated and described, we claim—

1. The combination with the air-tube of a tire, of a shield having a rough inner surface fitted over and inclosing said tube for more than half its circumference and provided with openings in its peripheral portion, and a series of shoes independently supported on the tube and projecting through the openings in the shield, said shoes having flanges which lie between the tube and shield, and said shield being held on the tube by the inflation of the latter, substantially as described.

2. The combination with the air-tube of a wheel-tire, of a shield, having a rough inner surface fitted over and inclosing said tube for more than half its circumference, and a series of shoes secured by the shield to the tube and projecting beyond the shield to form the traction-surface of the wheel, substantially as described.

3. The combination with the air-tube of a tire, of a shield fitted over the tube and having a rough inner surface, said shield inclosing the tube for more than half of its circumference and being held on the tube by the inflation of the latter, and shoes independently supported on the tube and held thereon by the shield, said shoes projecting beyond the shield, substantially as described.

In testimony whereof we affix our signatures in presence of two witnesses.

WILLIAM WILEY SCARBOROUGH.
CHARLES EDWARD SCHULTZ.

Witnesses:
MAUD HELMER,
K. B. LINDSAY.